(No Model.)
R. DURR.
FIRE ALARM.
No. 303,367. Patented Aug. 12, 1884.
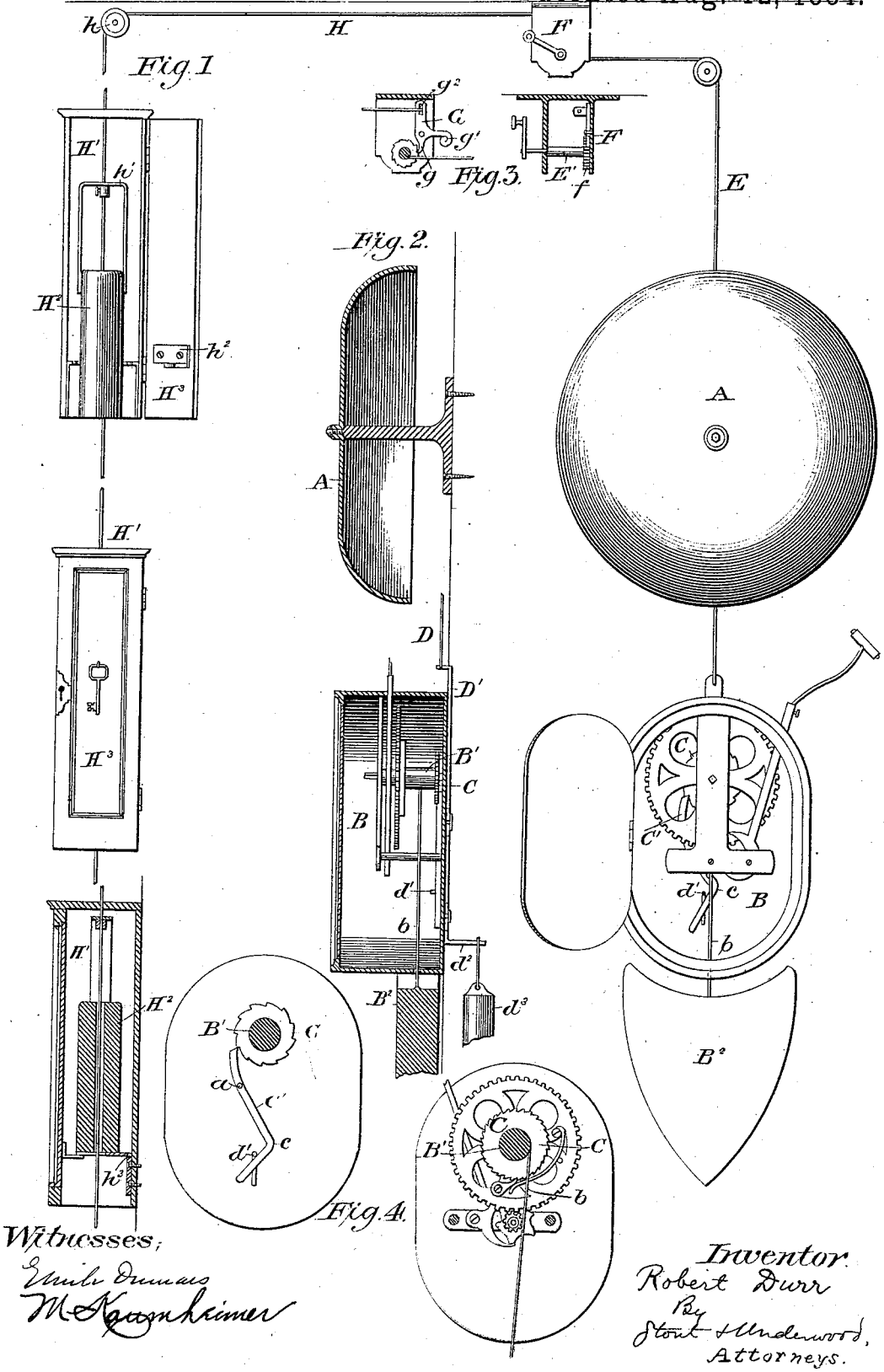
Witnesses:
Emile Dumais
M. Kaumheimer
Inventor
Robert Durr
By
Stout & Underwood,
Attorneys.

UNITED STATES PATENT OFFICE.

ROBERT DURR, OF MILWAUKEE, WISCONSIN.

FIRE-ALARM.

SPECIFICATION forming part of Letters Patent No. 303,367, dated August 12, 1884.

Application filed February 21, 1883. (No model.)

*To all whom it may concern:*

Be it known that I, ROBERT DURR, of Milwaukee, in the county of Milwaukee, and in the State of Wisconsin, have invented certain new and useful Improvements in Fire-Alarms for Hotels, &c.; and I do hereby declare that the following is a full, clear, and exact description thereof.

My invention relates to a system of alarms for hotels and other large buildings in case of fire, and will be fully described hereinafter.

In the drawings, Figure 1 is a view of my system in elevation, the bell and striker shown being those located in the upper story of the building. Fig. 2 is a sectional view of the bell and striker, representing those located in the lowest story of the building. Figs. 3 and 4 are details.

A is a bell, which is hung just above a striker, B, which may be of any well-known construction, and which is to be operated by a weight and cord. B' is the main shaft of the striker, upon which the weight B² is supported by a cord, $b$. When the cord $b$ is wound upon the shaft B', it is prevented from unwinding by a ratchet-wheel, C, and dog C', which latter is pivoted to the back part of the box. The pawl-arm of the dog C' is shorter than the tripping-arm, and the latter is bent so that whether the pawl is engaged with the teeth of the ratchet-wheel or not, the elbow $c$ will project forward of the pivot $a$, and that portion of the dog from elbow $c$ to its lowest extremity will project back under the pivot $a$. Now, therefore, the pawl end of dog C' will be held by the weight of the elbow $c$ in position to constantly engage with the ratchet-wheel C. I propose to duplicate this device as many times as there are floors in the building, and, arranging them one above the other, I propose to connect them by a wire cable, D. This cable is made in sections, each of which is about long enough to reach from the bell-box in one story to that in another, and the sections are connected by slides D', each of which slides is secured to the back of a bell-box, B, in such a manner as to have vertical play, and each of them has a lug or pin, $d'$, that projects through the back of the box in position to engage with the lower end of the dog C', as shown in Fig. 1. The lowest of the slides D' has an elbow, $d^2$, from which is suspended a weight, $d^3$, and the highest slide is suspended from a wire, E, and the other end of this wire is secured to an axle, E', that has journals in a housing, F, that depends from the ceiling of the upper story; and this axle carries a ratchet-wheel, $f$. Above and in front of the axle I pivot a lever, G, which has a ratchet-tooth, $g$, a weighted arm, $g'$, and a handle, $g^2$, and a wire, H, attached to the handle $g^2$, extends along the ceiling over a pulley, $h$, down into a box, H', that is secured to the side of the wall on the upper floor, and thence through the bail $h'$ of a weight, H², and then through the center of the weight, and then on down through a like box and weight in each story below successively. A button is secured to the wire H just beneath the bail of each weight, so that the falling of the weight of any box will cause it to draw upon the wire, and through it the handle $g^2$ of lever G. I provide each box with a hinged bottom, $h^3$, that is held shut by a projection, $h^2$, on the door H³ when closed, and upon this bottom the weight rests normally, but as soon as the door is opened the weight falls until stopped by a button on the wire H. I propose to lock each box and hang its key in a recess in one side of it, and then close the recess by a glass plate, so that the box cannot be opened without breaking the glass. This same system may be connected with trap-doors in various parts of the building, so that, simultaneously with the alarm, these doors may be opened to permit the escape of smoke, &c., which are often the chief causes of disaster.

Having thus fully described my invention, what I claim as new, and desire to secure by Letters Patent, is—

1. In an alarm system for buildings, the combination of a series of bells, A, and striker-boxes B, each striker having shaft B', cord $b$, weight B², ratchet-wheel C, dog C', pivoted to the box of the striker, and having short or pawl arm, and longer bent arm $c$, and vertical slide D', with projecting lug or pin $d'$, the said slides moving vertically in ways in the back of their respective striker-boxes, and connected by wires D, the slide of the upper box being suspended by a wire, E, and the slide of the lower box having an elbow, $d^2$, from which is suspended a weight, $d^3$, all arranged and adapted to operate substantially as set forth.

2. In an alarm system for buildings, the combination of the wire H and weight-boxes H', vertically-perforated weights H², with perforated bails h', the said wire passing through the perforations in the weights and their bails, and being provided with buttons between the under side of each bail and the top of its weight, and each weight-box having a door, H³, with inward projection, h², together with a hinged bottom, h³, supported, when the door is closed, upon the projection h², whereby the weight is also supported with its bail above the button on the wire, substantially as set forth.

3. In an alarm system for buildings, the combination, with the bell and striker and connecting parts, and with the weights and weight-boxes and connecting-wire H, of the housing F, axle E', wire E, ratchet-wheel $f$, and lever G, with ratchet-tooth $g$, weighted arm $g'$, and handle $g^2$, all connected together, and adapted to operate substantially as set forth.

4. In an alarm system for buildings, the combination, with wires running through the building to the striker, of boxes the doors of which are provided with rests and weights through which the wire passes, substantially as set forth.

In testimony that I claim the foregoing I have hereunto set my hand, on this 26th day of January, 1883, in the presence of two witnesses.

ROBERT DURR.

Witnesses:
S. S. STOUT,
ADOLPH KLEIN.